US009286197B2

(12) United States Patent
Ledenev et al.

(10) Patent No.: US 9,286,197 B2
(45) Date of Patent: Mar. 15, 2016

(54) METHOD AND SYSTEM OF TESTING SOFTWARE USING REAL TIME REPLICATION

(75) Inventors: Alexei Ledenev, Nea-Ziona (IL); Ilan Shufer, Tel Aviv (IL)

(73) Assignee: Hewlett Packard Enterprise Development LP, Houston, TX (US)

( * ) Notice: Subject to any disclaimer, the term of this patent is extended or adjusted under 35 U.S.C. 154(b) by 736 days.

(21) Appl. No.: 12/937,350

(22) PCT Filed: May 29, 2008

(86) PCT No.: PCT/US2008/065053
§ 371 (c)(1),
(2), (4) Date: Oct. 11, 2010

(87) PCT Pub. No.: WO2009/145769
PCT Pub. Date: Dec. 3, 2009

(65) Prior Publication Data
US 2011/0029956 A1 Feb. 3, 2011

(51) Int. Cl.
*G06F 11/36* (2006.01)
(52) U.S. Cl.
CPC .................. *G06F 11/3696* (2013.01)
(58) Field of Classification Search
USPC .......................................................... 717/125
See application file for complete search history.

(56) References Cited

U.S. PATENT DOCUMENTS

| | | | |
|---|---|---|---|
| 5,630,049 A | | 5/1997 | Cardoza et al. |
| 5,754,860 A | * | 5/1998 | McKeeman et al. ........... 717/124 |
| 6,708,224 B1 | * | 3/2004 | Tsun et al. .................... 719/316 |
| 7,299,452 B1 | | 11/2007 | Zhang et al. |
| 7,743,090 B1 | * | 6/2010 | Gibson et al. ................. 709/202 |
| 2003/0159089 A1 | * | 8/2003 | DiJoseph ........................ 714/38 |

(Continued)

FOREIGN PATENT DOCUMENTS

| | | |
|---|---|---|
| JP | 1994-103104 | 4/1994 |
| JP | 1996-006818 | 1/1996 |

(Continued)

OTHER PUBLICATIONS

IEEE 100 The Authoritative Dictionary of IEEE Standards Terms, Feb. 27, 2007, IEEE, Seventh Edition, pp. 469, 767-768, Retrieved Feb. 9, 2014.*
International Searching Authority, International Search Report and The Written Opinion, 11 pages, Feb. 2009.
Supplementary European Search Report, Apr. 13, 2011, European Patent Application No. 08780711.1, 6 pages.

*Primary Examiner* — Li B Zhen
*Assistant Examiner* — Joanne Macasiano
(74) *Attorney, Agent, or Firm* — Hewlett Packard Enterprise Patent Department

(57) ABSTRACT

Method and system of testing software using real time replication. At least some illustrative embodiments are methods comprising interacting (by a human tester) with a first software program executed on a first computer system (the interacting causes an operation to be performed on the first software program), duplicating the operation on a second software program executed on a second computer system coupled to the first computer system (the duplicating on the second computer system in real time with the interacting and the duplicating without a human tester), programmatically analyzing a result of the operation on the first computer system against a result of the operation on the second computer system, and notifying the human tester (by way of the first computer system) when the result of the operation on the second computer system is unexpected.

18 Claims, 2 Drawing Sheets

(56) References Cited

U.S. PATENT DOCUMENTS

| | | |
|---|---|---|
| 2004/0034696 A1 | 2/2004 | Joffrain et al. |
| 2004/0205721 A1 | 10/2004 | Colaiuta |
| 2005/0065766 A1* | 3/2005 | Creamer et al. ............ 703/21 |
| 2005/0193269 A1* | 9/2005 | Haswell et al. ............ 714/38 |
| 2007/0006036 A1* | 1/2007 | Devas et al. ............ 714/38 |
| 2008/0066057 A1 | 3/2008 | Aoyama et al. |
| 2008/0098272 A1 | 4/2008 | Fairbanks et al. |
| 2009/0249216 A1* | 10/2009 | Charka et al. ............ 715/744 |

FOREIGN PATENT DOCUMENTS

| | | |
|---|---|---|
| JP | 1997-508741 | 9/1997 |
| JP | 2005-293053 | 10/2005 |
| JP | 2006-350675 | 12/2006 |
| JP | 2008-068794 | 3/2008 |

* cited by examiner

METHOD AND SYSTEM OF TESTING SOFTWARE USING REAL TIME REPLICATION

BACKGROUND

One of the phases of software development is software testing. That is, the software is tested to ensure that interactions with the software produce expected results. For purpose of this discussion, software testing may be conceptually divided into two areas, functional testing and configuration testing. In functional testing, the internal operation of the software is tested. That is, the testing determines whether the software correctly performs the functions for which it was designed. A subcomponent of the functional testing is testing of user interfaces for regional or international operation. For example, while the underlying task of a program may be the same regardless of execution location (e.g., shopping cart software), the user interface language (e.g., Japanese, French, English) and currency type may differ.

In configuration testing, the operation of the software in different operating configurations is tested. For example, before release of a Java-based program to be executed by end-users through a web browser, the developer may test that the Java-based program works correctly on computer systems with differing hardware and/or software configurations, or on different versions of a Java. Another example is testing whether a web application can be deployed on different J2EE servers (e.g., WebSphere, WebLogic or JBoss).

BRIEF DESCRIPTION OF THE DRAWINGS

For a detailed description of exemplary embodiments, reference will now be made to the accompanying drawings in which.

NOTATION AND NOMENCLATURE

Figure 1:
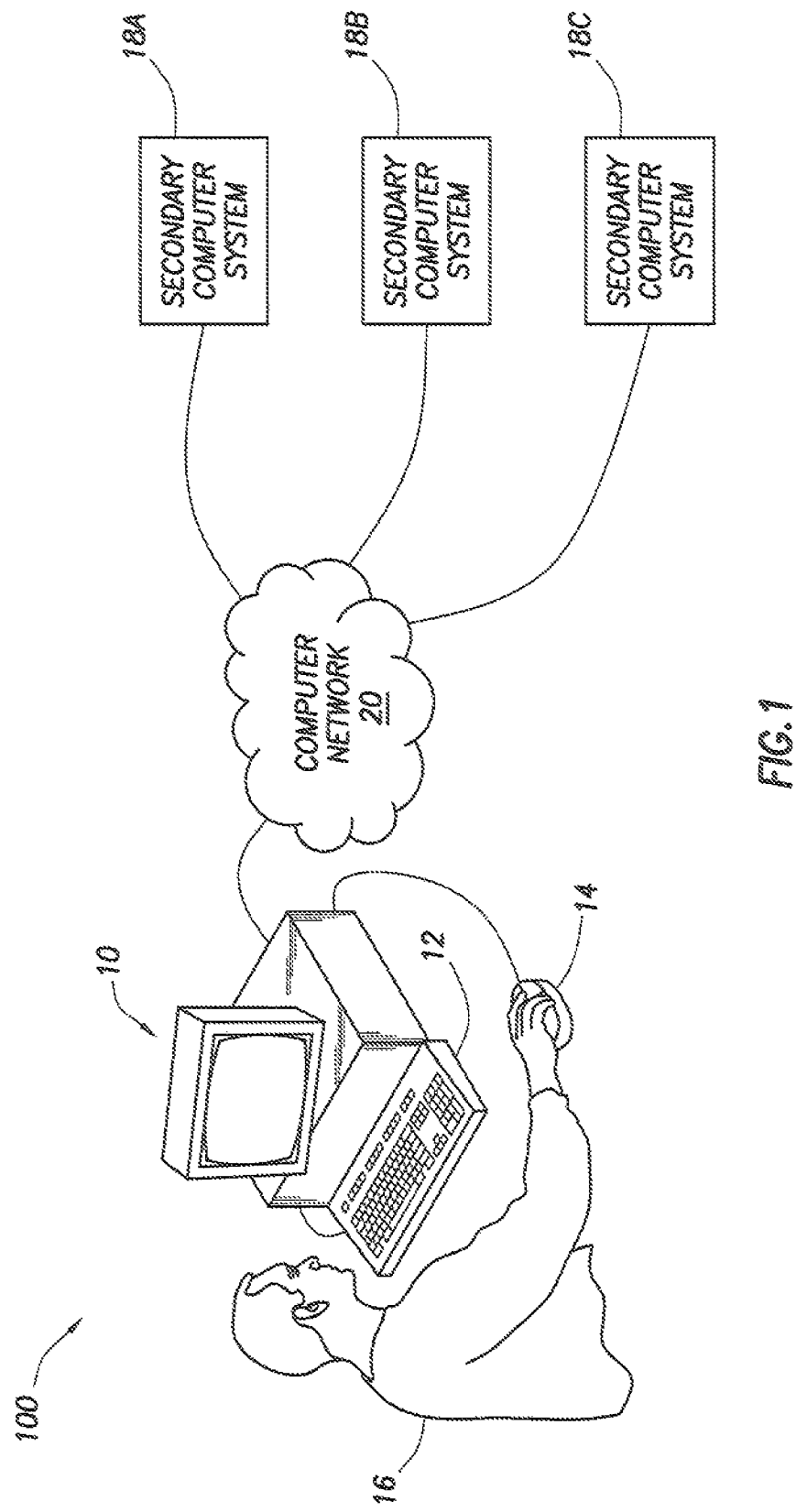
FIG. 1 shows a system in accordance with at least some embodiments.

Certain terms are used throughout the following description and claims to refer to particular system components. As one skilled in the art will appreciate, different companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection.

An amount of time taken to recognize an action or operation performed on a first computer system, to transmit a message across a computer network to a second computer system, and to perform the action/operation on the second computer system shall not negate that the action/operation on the first computer system takes place in "real time" or "substantially simultaneously" with the duplicate action/operation on the second computer system.

"Programmatically" shall mean that the operation or function is performed by a program executing on a computer system.

"Duplicate copy" in reference to computer programs shall mean a program having the same underlying functionality as the program of which it is a "duplicate copy," and status as a "duplicate copy" shall not be negated by differences in region-specific user interfaces (e.g., shall not be negated by differences in language, time zone, time format, or currency type) and/or differences in release versions of the same program.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

The various embodiments are directed to systems and methods for testing software by simultaneous replication of user actions on multiple systems. Inasmuch as a system for testing software likewise uses software to perform the testing, the software tested will be referred to as "software under test," and the software used to facilitate the testing will be referred to as "test duplication software." However, the test duplication software does more than just duplication, so reference to "test duplication software" should not be construed to limit the functionality. The testing in accordance with the various embodiments may be conceptually divided into two categories: functional testing (such as internationalization testing), and configuration testing. Each will be discussed in turn.

In functional testing, the internal operation of the software under test is analyzed to ensure that the software under test performs as designed and/or expected. For example, a software program designed to implement online commerce (i.e., shopping cart software) may be tested to ensure that items selected are properly placed in the "shopping cart" in the appropriate quantities, that the software under test transitions appropriately to "check out," that payment information is requested and appropriately received, and that the software correctly interfaces with other programs to ensure timely shipping of the purchased products.

A subcomponent of functional testing is testing user interfaces. The underlying functionality of a software program may be used in any part of the world; however, the user interface parameters differ from locale-to-locale and/or country-to-country. For example, while the underlying task of a program may be the same regardless of execution location (e.g., shopping cart software), user interface language (e.g., Japanese, French, English), time zone, time format, date format, and currency type may differ substantially. Thus, functional testing may involve testing user interfaces for proper regional operation even if the underlying functionality is not tested or is simultaneously tested.

In configuration testing, the software under test is analyzed to ensure proper operational on differing computer system environments. For example, before release of a Java-based program to be executed by end-users through a web browser, the developer may test: that the Java-based program works correctly on computer systems with differing browser types (e.g., Internet Explorer®, Firefox®); that the Java-based program operates correctly on different Java runtime engines; that the Java-based program works correctly on computer systems with differing operating systems (e.g., Windows® XP, Linux®); that the Java-based program work correctly on systems with different operating system versions and/or subversions; and that the Java-based program works correctly on computer systems with differing hardware types (e.g., Intel® processors, AMD® processors, and graphics adapters from varying vendors). While the testing may be conceptually divided as discussed, testing can involve testing both functionality and configuration testing simultaneously, and thus the conceptual division should not be construed as a limitation as to what testing can be simultaneously performed. So as not to unduly complicate the discussion, configuration testing will be discussed first.

FIG. 1 illustrates a system 100 in accordance with at least some embodiments. In particular, the system comprises a primary computer system 10. The primary computer system 10 has a keyboard 12 and mouse 14 that enable a human tester 16 to interact with the software under test and test duplication software, both executed by the primary computer system 10. The primary computer system 10 couples to a plurality of secondary computer systems 18 by way of a computer network 20. In accordance with at least some embodiments, each of the secondary computer systems 18 execute a duplicate copy of the software under test, and likewise execute a version of the test duplication software.

Figure 2:
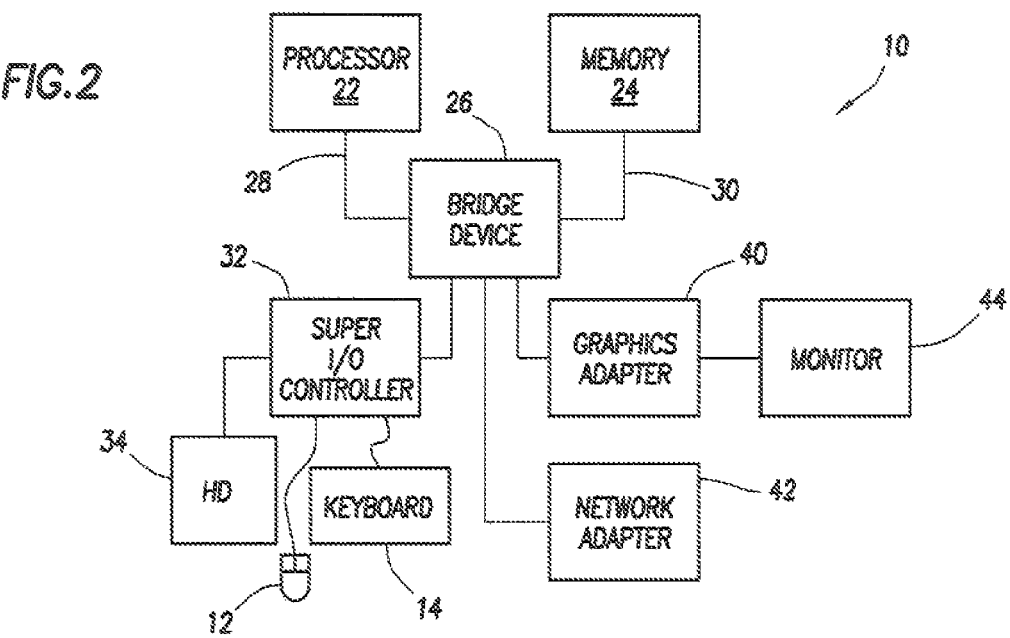
FIG. 2 shows a computer system in accordance with at least some embodiments.

FIG. 2 shows an illustrative primary computer system 10 in greater detail. In particular, primary computer system 10 comprises a processor 22 coupled to a memory device 24 by way of a bridge device 26. Although only one processor 22 is shown, multiple processor systems, and systems where the "processor" has multiple processing cores, may be equivalently implemented. The processor 22 couples to the bridge device 26 by way of a processor bus 28 and the memory 24 couples to the bridge device 28 by way of a memory bus 30. Memory 24 is any volatile or non-volatile memory device, or array of memory devices, such as random access memory (RAM) devices, dynamic RAM (DRAM) devices, static DRAM (SDRAM) devices, double data rate DRAM (DDR DRAM) devices, or magnetic RAM (MRAM) devices.

The bridge device 26 comprises a memory controller that asserts control signals for reading and writing the memory 24, the reading and writing both by processor 22 and by other devices coupled to the bridge device 26 (i.e., direct memory access (DMA)). The memory 24 is the working memory from the processor 22, which stores programs executed by the processor 22 and which stores data structures used by the programs executed on the processor 22. In some cases, the programs held in memory 24 are copied from other devices (e.g., hard drive 34, discussed below) prior to execution.

Bridge device 26 not only bridges the processor 22 to the memory 24, but also bridges the processor 22 and memory 24 to other devices. For example, illustrative computer system 10 comprises a super input/output (I/O) controller 32. The super I/O controller 32 interfaces various I/O devices to the computer system. In the illustrative primary computer system 10, the super I/O controller 32 enables coupling and use of a non-volatile memory device 34 (such as a hard drive (HD)), a pointing device or mouse 14, and a keyboard 12. The super I/O controller 32 may also enable use of other device not specifically shown (e.g., compact disc read only memory (CDROM) drives, Universal Serial Bus (USB) ports), and is referred to as "super" because of the many I/O devices for which it enables use.

Still referring to FIG. 2, the bridge device 26 further bridges the processor 22 and memory 24 to a graphics adapter 40 and network adapter 42. Graphics adapter 42 is any suitable graphics adapter for reading display memory and driving a monitor 44 with the graphics images represented in the display memory. In some embodiments, the graphics adapter 40 internally comprises a memory area to which graphics primitives are written by the processor 22 and/or by way DMA writes between the memory 24 and the graphics adapter 40. The graphics adapter 40 couples to the bridge device by way of any suitable bus system, such as peripheral components interconnect (PCI) bus or an advanced graphics port (AGP) bus. In some embodiments, the graphics adapter 40 is integral with the bridge device 26.

Network adapter 42 enables the primary computer system 10 to communicate with other computer systems over a computer network. In some embodiments, the network adapter 42 provides access to a local area network (LAN) or wide area network (WAN) by way of hardwired connection (e.g., Ethernet network), and in other embodiments the network adapter 42 provides access to the LAN or WAN through a wireless networking protocol (e.g., IEEE 802.11(b), (g)). In yet still other embodiments, the network adapter 42 provides access to the Internet through a wireless broadband connection, such as a cellular-based wireless broadband Internet connection. Thus, the secondary computer systems 18 may be locally coupled (i.e., within a few feet), or may be many miles from the primary computer system 10.

While FIG. 2 is discussed in reference to primary computer system 10, the description is equally applicable to any of the secondary computer systems 18. For reasons that will become apparent based on the discussion below, however, the secondary computer systems need not necessarily implement the I/O devices (e.g., keyboard and mouse may be omitted), need not necessarily implement monitor 44, and in some embodiments may implement differing hardware and software configurations.

Returning again to FIG. 1. In the illustrative case of configuration testing, the primary computer system 10 loads and executes the software under test, as well as the test duplication software. Each of the secondary computer systems 18 likewise load and execute a duplicate copy of the software under test, and a version of the test duplication software. However, for configuration testing, the secondary computer systems implement a different computing environment than the primary computer system 10. For example, each secondary computer system 18 may implement a different web browser (e.g., one implements Internet Explorer® (IE) 6.0, one implements IE 7.0, and the third implements Firefox®). As yet another example, each secondary computer system 18 may implement a different operating system type (e.g., one implements Windows® XP, one implements Windows® Vista™, and one implements Linux®). As yet another example, each secondary computer system may implement a different hardware configuration (e.g., one implements an Intel® Core™ 2 Duo, one implements an Intel® Pentium® 4, and one implements an AMD® Athlon™). As yet another example, each secondary computer system may implement the same hardware as the primary computer system, but may connect to an application server (e.g., web server, database) deployed on a middleware platform different than that of the primary server.

Regardless of the precise configuration of each of the secondary computer systems 10, the human tester 16 interacts with the software under test executed on primary computer system 10. As the human tester 16 interacts with the software under test on primary computer system 10, the test duplication software executed on primary computer system 10 creates a representation of the interaction. For example, if the human tester 16 enters data in a text box, checks a check box, and presses an enter pushbutton (on the screen or otherwise), the test duplication software copies or otherwise creates a representation of the data, check box action and pressing enter. The test duplication software then sends the representation of the interaction to each of the secondary computer systems. Once received, each of the secondary computer systems 18 programmatically applies the operation or interaction to the software under test on the secondary computer systems 18. Stated otherwise, the test duplication software interacts with the software under test on the secondary computer systems in response to the representation of the interaction on the primary computer system 10. In accordance with at least some embodiments the interaction of the human tester 16 with the software under test, and the corresponding programmatic interaction on each of the secondary computer systems 18 takes place in real time.

With respect to creating the representation of interaction, in some embodiments the representation of interaction is an absolute tracking of mouse position, mouse button assertion and keyboard entries. Considered from the aspect of the receiving test duplication software on the secondary computer systems 18, a series of mouse movements, mouse assertions and/or keyboard entries are received, and those movements, assertions and entries are duplicated exactly on the secondary computer systems 18.

In other embodiments, the test duplication software on the primary computer system 10 delves into the executing code and/or data structures of the software under test, and thus the representation of interaction may specifically identify the features with which the human tester interacted without tracking mouse movements. The receiving test duplication software likewise then need not strictly duplicate mouse movements, but nevertheless duplicates the interactions taken by a more explicit interaction with the software under test on the secondary computer systems 18. Moreover, using representation of interactions that are not absolute mouse movements enables the secondary computer systems to interact with their respective software under test even when the user interface as between the primary computer system and the secondary computer systems 18 differ (e.g., different screen size, pop-up window spawns to different location on the secondary computer systems). Several commercially available computer program exist which have the ability to locate text entry boxes, check boxes and push buttons at different locations on the screen from the original interaction given sufficient information, and to recreate interaction at the changed locations on other computer systems. One such commercially available product is Quick Test Professional available from Hewlett-Packard Company, Palo Alto, Calif. However, operation of products such as the Quick Test Professional involves recording an entire interaction session between the human tester and the software under test to create a test script, and then applying the recorded test script again on the same machine or other machines at a later time. Stated otherwise, each interaction in a series of interactions is not sent in real time to the secondary computer systems.

With respect to the software under test on the primary computer system 10, in accordance with the various embodiments the human tester 16 is responsible for checking for expected operation. However, the test duplication software executed on the primary computer system 10 analyzes the result of the specific interaction, and creates a representation of the result of the interaction. Likewise, the versions of the test duplication software on the secondary computer systems 18 create a representation of the result of the programmatic interaction on their respective secondary computer systems 18. In accordance with some embodiments, each secondary computer system 18 sends its respective representation of the result to the test duplication software on the primary computer system 10. The test duplication software on the primary computer system 10 analyzes the representation of the result of the interaction on the primary computer system against the representation of the result from each of the secondary computer system, and alerts the human tester 16 when the result of the interaction on the secondary computer system 18 was unexpected. Consider, as an example, that the human tester 16 interacts with the software under test that results in spawning a pop-up window containing particular data. On one of the secondary computer systems, the pop-up window is not spawned, and on another secondary computer system the pop-up window is spawned, but the data is different. In this illustrative situation, the test duplication software notifies the human tester 16, by way of the computer system 10, that unexpected results occurred on two of the illustrative three secondary computer systems 18. The human tester 16 may then, through the computer system 10, view the results on the secondary computer systems 18 to determine whether the unexpected results are truly errors, or merely differences in operation caused by the different configurations.

In alternative embodiments, the primary computer system 10 sends the representation of the results to the each of the secondary computer systems 18, and the secondary computer systems are tasked with analyzing the representation of the results from the primary computer system 10 with the results from the programmatic interaction on their respective machines. In these embodiments, each secondary computer system 18 sends an indication to the primary computer system 10 when the analysis reveals unexpected results. Several commercially available computer program exist which have the ability to locate compare results of interactions as between different interactions with a software under test. One such commercially available product is Quick Test Professional noted above. Again, however, operation of products such as the Quick Test Professional involve recording an entire interaction session between the human tester and the software under test to create a test script, and then applying the recorded test script again on the same machine or other machines at a later time. Thus, the analysis of results in such a situation is not comparing results created by interactions in real time, but instead involves comparing current results against results obtained in a previous recording session. Stated otherwise, results of each interaction in a series of interactions are not sent in real time to/from secondary computer systems, and an analysis made in real time as to whether the results were unexpected.

Summarizing before continuing, in configuration testing in accordance with at least some embodiments, the primary computer system 10 and the secondary computer systems 18 implement differing configurations. Duplication copies of a software under test are executed on each computer system 10, 18. Test duplication software executed on the primary computer system 10 observes interactions between a human tester 16 and the software under test, records the interaction, and sends the representation of the interaction to the secondary computer systems 18 in real time. Each second computer system applies the interaction to its respective software under test, and the results are analyzed. On the primary computer system 10, the results are analyzed by the human tester 16. The results on the secondary computer systems are analyzed against the results on the primary computer system, and the human tester is notified if unexpected results are found. In this way, the human tester 16 can simultaneously test the software under test on varying computer system configurations.

Still referring to FIG. 1, the specification turns now to functional testing, and as a specific example, testing of user interfaces for proper regional operation. In the illustrative case of functional testing, the primary computer system 10 loads and executes the software under test, as well as the test duplication software. Each of the secondary computer systems 18 likewise load and execute a duplicate copy of the software under test, and a version of the test duplication software. For the conceptual division of functional testing, the secondary computer systems 18 each implement the same computing configuration as the primary computer system 10. However, other embodiments perform functional testing and configuration testing simultaneously, and so the conceptual division of functional testing using computer systems that implement the same configuration should not be construed as a limitation if the breadth of the disclosure.

The human tester 16 interacts with the software under test executed on primary computer system 10. As the human tester 16 interacts with the software under test on primary computer system 10, the test duplication software executed on primary computer system 10 creates a representation of the interaction. For example, if the human tester 16 "clicks" a location that triggers a drop-down menu, and selects an entry from the menu, the test duplication software copies or otherwise creates a representation of the menu interaction (e.g., the representation of the interaction for this specific case may be "SelectMenuItem ITEM NAME"). The test duplication software then sends the representation of the interaction to each of the secondary computer systems. Once received, each of the secondary computer systems 18 programmatically applies the interaction to the software under test on the secondary computer systems 18. As with respect to configuration testing, the interaction of the human tester 16 with the software under test, and the corresponding programmatic interaction on each of the secondary computer systems 18, takes place in "real time." Moreover, the representation of the interactions may be high level tracking of mouse and/or cursor movements, or may be lower-leveling delving into the executing code and/or data structures of the software under test.

With respect to the software under test on the primary computer system 10, in accordance with the various embodiments the human tester 16 is responsible for checking for expected operation. However, the test duplication software executed on the primary computer system 10 analyzes the result of the specific interaction, and creates a representation of the result of the interaction. Likewise, the versions of the test duplication software on the secondary computer systems 18 create a representation of the result of the programmatic interaction on their respective secondary computer systems 18. In accordance with some embodiments, each secondary computer system 18 sends its respective representation of the result to the test duplication software on the primary computer system 10 for analysis and alerting of the human tester 16 if the result of the interaction on the secondary computer system 18 was unexpected.

Consider, as an example, that the human tester 16 interacts with the software under test that results in spawning a drop-down window containing particular selections. On one of the secondary computer systems, the drop-down window is spawned but in the wrong language, and on another secondary computer system the drop-down window is spawned in the correct language, but the selections (taking into account language) are different. In this illustrative situation, the test duplication software executed on the primary computer system 10 performs language translation on the representation of the interaction received from each secondary computer system, notifies the human tester 16 that unexpected results occurred on two of the illustrative three secondary computer systems 18. The human tester 16 may then, through the computer system 10, view the results on the secondary computer systems 18 to determine whether the unexpected results to verify the unexpected result and/or to determine the level shortcoming. The drop-down menus in different language is merely illustrative of any regional differences in programs. A non-exhaustive list of such regional differences is: language, variation of language with the broad category of language (e.g., U.S. English, U.K. English), time zone, time format, currency type, and currency format.

In alternative embodiments, the primary computer system 10 sends the representation of the results to the each of the secondary computer systems, and the secondary computer systems are tasked with analyzing the representation of the results from the primary computer system 10 with the results from the programmatic interaction on their respective machines. In the illustrative case of the drop-down menu above, each secondary computer system 18 performs any translations needed, and in a common language analyzes the results as between the two computer systems. In these embodiments, each secondary computer system 18 sends an indication to the primary computer system 10 when the analysis reveals unexpected results.

Figure 3:
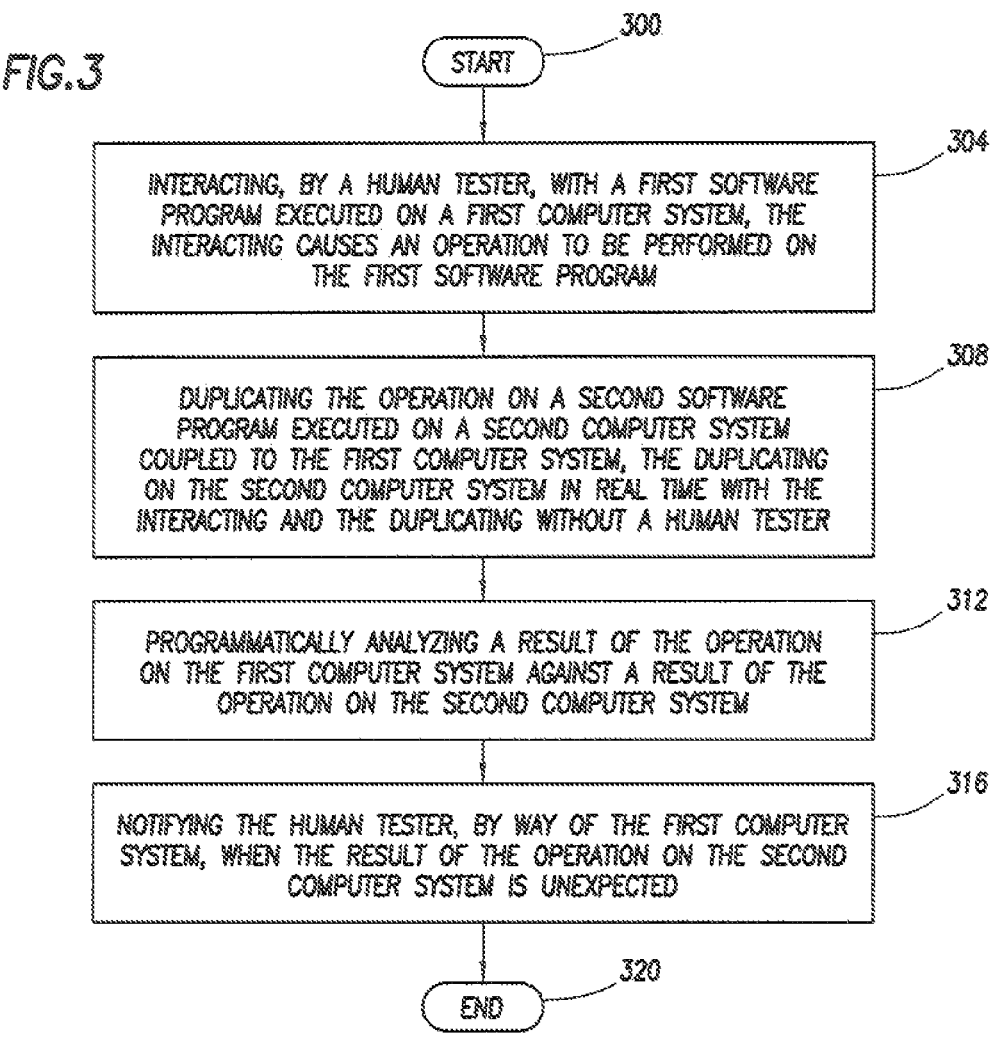
FIG. 3 shows a method in accordance with at least some embodiments.

FIG. 3 illustrates a method in accordance with at least some embodiments. In particular, the method starts (block 300) and proceeds to interacting, by a human tester, with a first software program (i.e., software under test) executed on a first computer system, the interacting causes an operation to be performed on the first software program (block 304). For example, the human tester may interact with the first software program to test the first software program's functionality, or may interact with the first software program to test the first software program's operation in a particular computer system configuration. Substantially simultaneously with the interaction, the interaction is duplicated on a second software program executed on a second computer system coupled to the first computer system (block 308). In accordance with the various embodiments, the duplicating on the second computer system occurs in real time with the interacting on the first computer system; however, the duplicating on the second computer system occurs without use of a human tester performing the interaction. Stated otherwise, the duplicated interaction on the second computer system is performed programmatically.

Still referring to FIG. 3, next the results of the operation on the first computer system are programmatically analyzed against the result of the operation on the second computer system (block 312). In some embodiments, the second computer system sends a representation of the result to the first computer system, and the first computer system performs the analysis. In other embodiments, the first computer system sends a representation of the result on the first computer system to the second computer system, and the second computer system performs the analysis. Regardless of which computer system performs the analysis, the human tester is notified (by way of the first computer system) when the result of the operation on the second computer system is unexpected (block 316), and the method ends (block 320).

From the description provided herein, those skilled in the art are readily able to combine software created as described with appropriate general-purpose or special-purpose computer hardware to create a computer system and/or computer subcomponents in accordance with the various embodiments, to create a computer system and/or computer subcomponents for carrying out the methods of the various embodiments, and/or to create a computer-readable media for storing a software program to implement the method aspects of the various embodiments.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method of testing comprising:
simultaneously and separately performing functional testing and configuration testing on a first software program by responding, to a predetermined action of a human tester, on the first software program executed on a first computer system, wherein the predetermined action causes a predetermined operation to be performed on the first software program;
duplicating the predetermined operation on a second software program executed on a second computer system coupled to the first computer system, wherein the duplicating on the second computer system is performed in real time with the responding and the duplicating is performed without a human tester;
programmatically analyzing, by the second computer system, a result of the predetermined operation on the first computer system against a result of the predetermined operation on the second computer system;
sending, from the second computer system to the first computer system an indication that the analyzing reveals unexpected results; and
notifying the human tester, by way of the first computer system, when the result of the operation on the second computer system is unexpected and wherein the first computer system implements an underlying functionality and a first configuration and the second computer system implements the same underlying functionality and a second configuration different than the first configuration.

2. The method of claim 1 wherein the duplicating further comprises:
recording the predetermined action;
sending a representation of the recorded predetermined action to the second computer system over a computer network; and
applying the predetermined action represented by the representation to the second software program.

3. The method of claim 1 wherein the first computer system implements a first configuration with a release version and the second computer system implements a second configuration different release version than the first configuration.

4. The method of claim 1 wherein the first software program is configured to display and accept text in a first language and the second software program configured to display and accept text in a second language different than the first language.

5. The method of claim 1 wherein the first software program is configured to execute in a first time zone and the second software program is configured to execute in a second time zone different than the first time zone.

6. The method of claim 1 wherein the first software program is configured to display monetary values in a first currency and second software program is configured to display monetary values in a second currency different than the first currency.

7. The method of claim 1 wherein performing functional testing of the first software program comprises testing the internal operation of the first software program to determine whether the first software program correctly performs functions for which the first software program is designed.

8. The method of claim 1 wherein performing configuration testing of the first software program comprises testing operation of the first software program in two different computer system environments.

9. The method of claim 8 wherein the two different computer system environments comprises two different web browsers.

10. A system comprising:
a primary computer system configured to execute a software under a simultaneous test of functionality and a separate test of configuration;
a plurality of secondary computer systems coupled to the primary computer system by way of a computer network, the secondary computer systems configured to execute respective duplicate functional but different configuration copies of the software under test;
wherein the primary computer system is configured to record a representations of interactions of a predetermined action of a human operator on the software under test, and to send the representations to the plurality of secondary computer systems;
wherein each secondary computer system is configured to receive the representation and apply, in real time with the response of the software under test to the predetermined action, the representation to the respective duplicate functional but different configuration copy of the software under test;
wherein each secondary computer system is further configured to analyze a result of a predetermined operation expected by the software under test based on the predetermined action against a result of the application of the representation to the duplicate functional but different configuration copy of the software under test in the secondary computer system; and
wherein the system is configured to alert the human operator when the comparison of the results on the primary and any secondary computer systems indicate unexpected operation of the duplicate functional but different configuration copy of the software under test.

11. The system of claim 10 wherein the primary computer system implements a first configuration as a function of at least one selected from the group consisting of:
an operating system type and a hardware configuration and each of the secondary computer systems implements a configuration different than the primary computer system.

12. The system of claim 10 wherein each secondary computer system is configured to apply the representation in a language different than a user interface language of the software under test.

13. The system of claim 10 wherein each secondary computer system is configured to apply the representation in a currency different than a currency used in a user interface of the software under test.

14. The system of claim 10 wherein the test of functionality comprises a test of user interfaces.

15. A non-transitory computer-readable media storing a program that, when executed by a processor, causes the processor to:
observe an both a predetermined action of a human on an application program executed on a first computer system and a response to the predetermined action of the application program to simultaneously and separately test functionality and configuration of the application program;

send, in real time with the observation, a representation of the predetermined action to a remote computer system coupled to the first computer system by way of a computer network;

determine a result of the predetermined action between the human and the application program on the first computer system;

send to the remote computer system an indication of the result of the predetermined action between the human and the application program executed on the first computer system;

receive from the remote computer system an indication of a relationship between the result of the predetermined action between the human and the application program executed on the first computer system and a result of applying the representation of the predetermined action to a duplicate functional but different configuration copy of the application program executed on the remote computer system; and alert the human if the comparison of a result obtained by the application program based on the predetermined action and a result obtained by a duplicate functional but different configuration copy of the application program executed on the remote computer system indicates an unexpected result on the remote computer system.

16. The non-transitory computer-readable media of claim 15 wherein the first computer system has a first configuration as a function of at least one selected from the group consisting of: an operating system type and a hardware configuration of the first computer system and the remote computer system has second configuration different than the first configuration.

17. The non-transitory computer-readable media of claim 15 wherein the application program is configured for a first language and the duplicated copy of the application program is configured for a second language different than the first language.

18. The non-transitory computer-readable media of claim 15 wherein, the test of the functionality of the application program comprises a test of the internal operation of the application program.

* * * * *